No. 896,337. PATENTED AUG. 18, 1908.
J. A. SWENSON.
LAWN MOWER.
APPLICATION FILED MAR. 25, 1907.
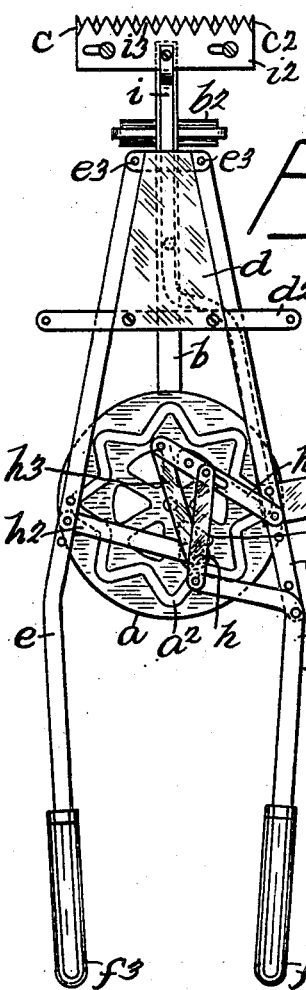
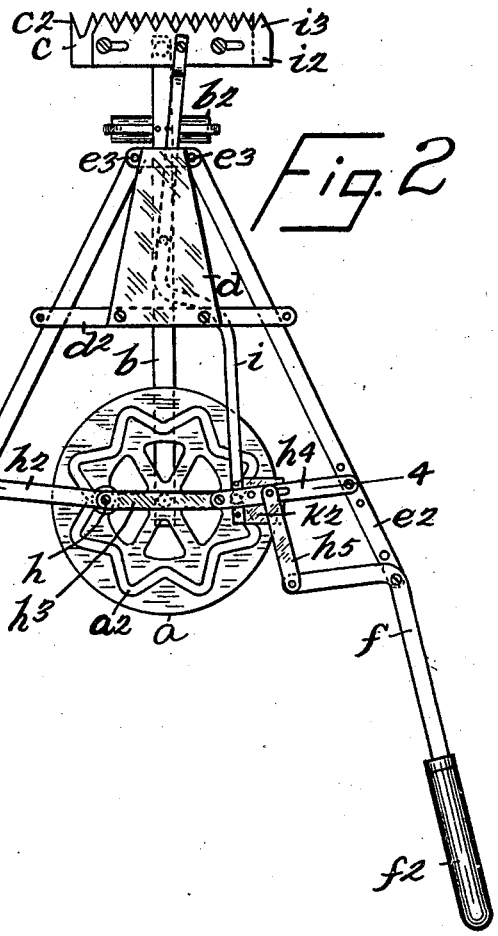
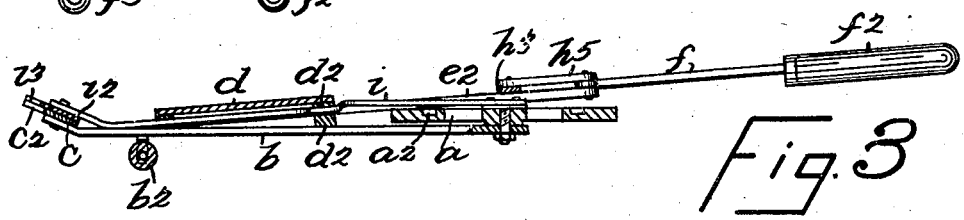
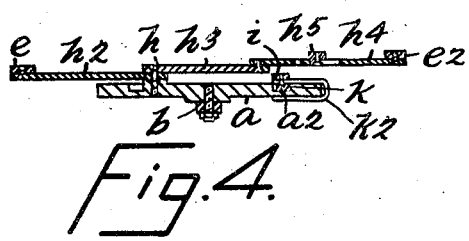
Witnesses:
G. L. Sachs.
Inventor
John A. Swenson
By Attorney
J. Chris Larsen

UNITED STATES PATENT OFFICE.

JOHN A. SWENSON, OF BROOKLYN, NEW YORK.

LAWN-MOWER.

No. 896,337.  Specification of Letters Patent.  Patented Aug. 18, 1908.

Application filed March 25, 1907. Serial No. 364,331.

*To all whom it may concern:*

Be it known that I, JOHN A. SWENSON, a citizen of the United States of America, and residing at Brooklyn, in the county of Kings and State of New York, have invented certain new and useful Improvements in Lawn-Mowers, of which the following is a specification, such as will enable those skilled in the art to which it appertains to make and use the same.

This invention relates to lawn mowers and is an improvement over that shown and described in my United States Patent No. 847,213, issued to me on the twelfth of March, 1907, and the object thereof is to provide a device of this character by means of which grass and the like closely adjacent to fences, posts and other practically inaccessible places may be cut: a further object being to provide such a device which may be readily started from any position of its parts, thereby overcoming what is known as "dead center", and which may be continuously operated when started and a still further object being to provide means for preventing "dead center" in any crank operated rotary device.

My invention is fully described in the following specification, of which the accompanying drawings form a part, in which the separate parts are designated by similar reference characters in each of the views, and in which:—

Figure 1 is a plan view of a lawn mower constructed according to my invention and showing one position of its parts; Fig. 2 is a similar view but showing another position of its parts; Fig. 3 is a central longitudinal section thereof; and Fig. 4 is a section thereof taken on the line 4—4 of Fig. 2.

In the drawings forming a part of this application, I have shown a disk $a$ provided with a cam groove $a^2$ and rotatably mounted upon a bar $b$ at one end thereof and the bar $b$ has a transversely arranged plate $c$ at the other end thereof which is provided with cutting teeth $c^2$ and the bar $b$ is also provided with a roller $b^2$ at a point adjacent to the outer end thereof.

Secured above the bar $b$ is a plate $d$ to which are secured two transversely arranged guides $d^2$ for two operating arms $e$ and $e^2$ which are pivotally mounted at $e^3$ upon the plate $d$ and pivotally mounted at the inner end of the arm $e^2$ is a crank lever $f$ provided with a handle $f^2$ and the arm $e$ is also provided with a handle $f^3$. Pivotally mounted upon a pin $h$ firmly fixed in the disk $a$ is a link $h^2$ also pivoted to the arm $e$ and a crank arm $h^3$ is firmly secured against movement to the said pin $h$, said crank arm being connected with a supplemental link $h^4$ in turn pivoted to the arm $e^2$ and forming a toggle lever which is connected with the crank lever $f$ by means of a link $h^5$ and, if desired, the connection between the links $h^4$ and $h^5$ may be made sliding as shown in the drawings. Pivotally mounted beneath the plate $d$ is a lever $i$ which carries a plate $i^2$, provided with cutting teeth $i^3$, at its outer end, the connection therebetween being a pivotal one and the plate $i^2$ is slidably secured to the plate $c$ in such manner as to permit the cutting teeth $c^2$ and $i^3$ to slide over each other. Mounted upon the inner end of the lever $i$ is a stud $k$ which rests in the cam groove $a^2$ and I preferably secure a yoke shaped plate $k^2$ to the lever $i$ and passed over the disk $a$ to insure permanent engagement of the stud and cam groove.

When the parts are in the position shown in Fig. 1, if the handles $f^2$ and $f^3$ are moved outwardly, the arm $e$, by means of the link $h^2$ rotates the disk $a$, this operation being assisted by the arm $e^2$, crank $h^3$ and link $h^4$, and crank lever $f$ and link $h^5$, and when the disk is so rotated, the lever $i$ is oscillated upon its pivot and the teeth $i^3$ are moved over the teeth $c^2$ and cutting results.

It will be seen that, if the link $h^2$, crank $h^3$ and link $h^4$ are in line with each other, a "dead center" of the arms $e$ and $e^2$ is produced which, without this invention, would require manual manipulation to overcome, but, because of the crank lever $f$, movement of the handle $f^2$ exerts force upon the crank arm $h^3$ through the link $h^5$ and thus rotates the disk beyond the "dead center" after which the arm $e$ becomes operative through an arc of 180 degrees to the opposite dead center of the said arms, these dead centers being transversely of the device whereas the possible dead centers of the lever $f$ are approximately longitudinally of the device thus making either the said arms or the said lever, or both, operative at any point of the rotation of the said disk.

If desired, a plurality of attaching points may be provided for the links and levers in order to produce the desired result at greater or less degrees of power in accordance with the material being cut and the speed of the operation and various other changes in and modifications of the form of construction shown may be made and the "dead center" preventer may also be changed to adapt it to other uses than that described and, with this reservation,

What I claim as new and desire to secure by Letters Patent, is:—

1. In a lawn mower, the combination of a rotary device, a support therefor, a cutter in operative connection with said device, an arm in operative connection with said device, a supplemental arm in operative connection with said device and means connected with said supplemental arm for exerting power to said rotary device in a direction different from that exerted by said arms.

2. In a lawn mower, the combination of a frame, a lever mounted thereon, a cutter on said lever, a disk provided with a cam groove for oscillating said lever, means for rotating said disk and devices for moving said rotating means from a dead center.

3. In a lawn mower, the combination of a frame, a lever thereon, a rotatable element for oscillating said lever, a cutter on said lever, arms and connections for rotating said rotatable element and means connected with one of said arms for overcoming a dead center of said rotatable element.

4. A lawn mower, comprising a frame, a lever thereon, a cutter on said lever, a rotatable element for oscillating said lever, pivoted arms on said frame, links connecting said arms with said rotatable element, a crank lever on one of said arms and a supplemental link connecting said crank lever and one of said first named links.

5. A lawn mower, comprising a frame, a lever thereon, a cutter on said lever, a disk provided with a cam groove for oscillating said lever, arms connected with said frame, a link connecting said disk and one of said arms, a crank on said disk a link connecting said crank with the other arm, a crank lever on said last named arm and a link connecting said crank lever and said last named link.

In testimony that I claim the foregoing as my invention I have signed my name in presence of the subscribing witnesses this 22nd day of March 1907.

JOHN A. SWENSON.

Witnesses:
B. L. SACHS,
H. NOTTLAN